United States Patent [19]
Miller et al.

[11] 3,921,569
[45] Nov. 25, 1975

[54] INSTRUMENTATION PRESENTATION

[75] Inventors: Arthur F. Miller; Robert C. Schmiedel, both of Oshkosh, Wis.

[73] Assignee: Brunswick Corporation, Skokie, Ill.

[22] Filed: Nov. 8, 1973

[21] Appl. No.: 413,889

[52] U.S. Cl............... 116/129 P; 116/129 E
[51] Int. Cl.²........................... G09F 9/00
[58] Field of Search........ 240/2.1, 8.14, 8.16, 8.18; 116/DIG. 36, 129 P, 129 E, 129 R

[56] References Cited
UNITED STATES PATENTS

| | | | |
|---|---|---|---|
| 2,117,442 | 5/1938 | McWeeny | 116/129 E |
| 2,158,925 | 5/1939 | Braswell | 116/129 E |
| 2,165,498 | 7/1939 | Moody | 116/129 E |

FOREIGN PATENTS OR APPLICATIONS

| | | | |
|---|---|---|---|
| 719,398 | 12/1954 | United Kingdom | 116/129 P |
| 374,340 | 6/1932 | United Kingdom | 116/129 E |

*Primary Examiner*—S. Clement Swisher
*Assistant Examiner*—Denis E. Corr
*Attorney, Agent, or Firm*—William G. Lawler, Jr.

[57] ABSTRACT

An instrument face constructed and lighted from behind so that only the information displayed thereby is illuminated, and incorporating a visual warning signal visable only over a selected value range of the displayed information. A rotating opaque disc incorporating a translucent pointer is arrayed behind a surrounding opaque ring bearing a translucent scale; such that light from behind may escape only through the scale and pointer. A red translucent area on the disc cooperates with an opening in the ring to provide a warning signal when the pointer registers a dangerous condition.

7 Claims, 4 Drawing Figures

INSTRUMENTATION PRESENTATION

BACKGROUND OF THE INVENTION

The invention is in the field of instrument lighting, and particularly pertains to a method of lighting instruments for marine use which eliminates all glare and reflected light; and, which incorporates a separate visual warning signal without the necessity of a separate circuit for the same.

Most present day instrument lighting installations for marine use are front lighted, that is, by lights positioned around the periphery of and to the front of the dial face of the instrument, or by light reflected onto the front face of the instrument. In this sort of installation not only are the information scale and pointer illuminated, but the entier face of the instrument as well. Much of this light gets reflected onto the cover glass of the instrument where it is diffused and causes a hazy appearance, and quite frequently spots of light appear on the instrument detract all of which serves to deteact from a clear and attractive presentation. Even in those instruments which employ back lighting, there is generally a hole through which an indicating needle extends, which hole permits unwanted light to escape from behind.

It is an objective of the invention to eliminate completely the aforementioned sort of extraneous light, so that the information scale appears upon an entirely black background, and the indicating needle appears to float in space.

In recent years it has been the practice, particularly in the automobile industry, to move away from meter type instrument to a simple indicator light. One of the objections to such indicator lights is that the operator has no continuing assurance that the circuit is operating. At the same time, the need for a separate attention getting warning light, in addition to a dial type presentation, is desired. The invention has met these two criteria by providing in a single installation both a dial type meter presentation and a separate visual warning signal.

Another objection to warning lights which traditionally employ a red lens is that their on-off condition cannot be easily determined when they are subjected to bright sunlight. The invention overcomes this subjection in that no red lens or red reflecting surface is exposed to the sunlight until the actual dangerous condition exists.

SUMMARY OF THE PRESENT INVENTION

Briefly the invention comprises a dial face including an outer ring containing an information scale and an inner rotating disc incorporating an indicating power. The disc is positioned closely adjacent to and overlaps the back side of the ring so that light may not easily pass between the two. The disc and indicating needle are driven by the motor mechanism of the instrument. Light sources are mounted behind the ring and disc and means provided to prevent light radiation from impinging directly thereon. The ring and disc are of translucent material and the scale and pointer may be painted on the face thereof with a translucent paint. The remainder of the faces of the ring and disc are preferable painted with an opaque material. An opening or clear window is provided in the ring and a red translucent area is provided in the disc. The window and red area are oriented such that nothing will appear in the ring window until a dangerous condition is indicated by the instrument, at which time the red area of the disc will move under the window in the ring as the indicator pointer moves to a corresponding hazardous value on the scale.

The invention has two primary areas of novelty. The first lies in the orientation and structure of the disc and ring so that no extraneous light is passed therethrough; and the second lies in the presentation therethrough; the visual warning signal.

A primary advantage of the invention lies in the fact that the visual warning signal is activated by a continuously indicating instrument which keeps the operator continuously informed on the operating state of his warning indicator. As long as the pointer responds to changes in engine operating conditions, the operator is assured that he will be appropriately warned should a hazardous condition arise.

Another advantage of the invention is that it provides a warning light at no additional expense, for no additional circuitry, light or mounting is required over that incorporated in the dial face itself.

Still another advantage of the invention is that by making all scribe marks, numbers, letters and the pointer red in color the night vision of the operator can be completely preserved.

Other objectives, advantages, and various further features of novelty and invention will be pointed out or will occur to those skilled in the art from a reading of the following specification in conjunction with the accompanying drawings.

DETAILED DESCRIPTION OF THE PREFERRED EMBODIMENT

Figure 1:
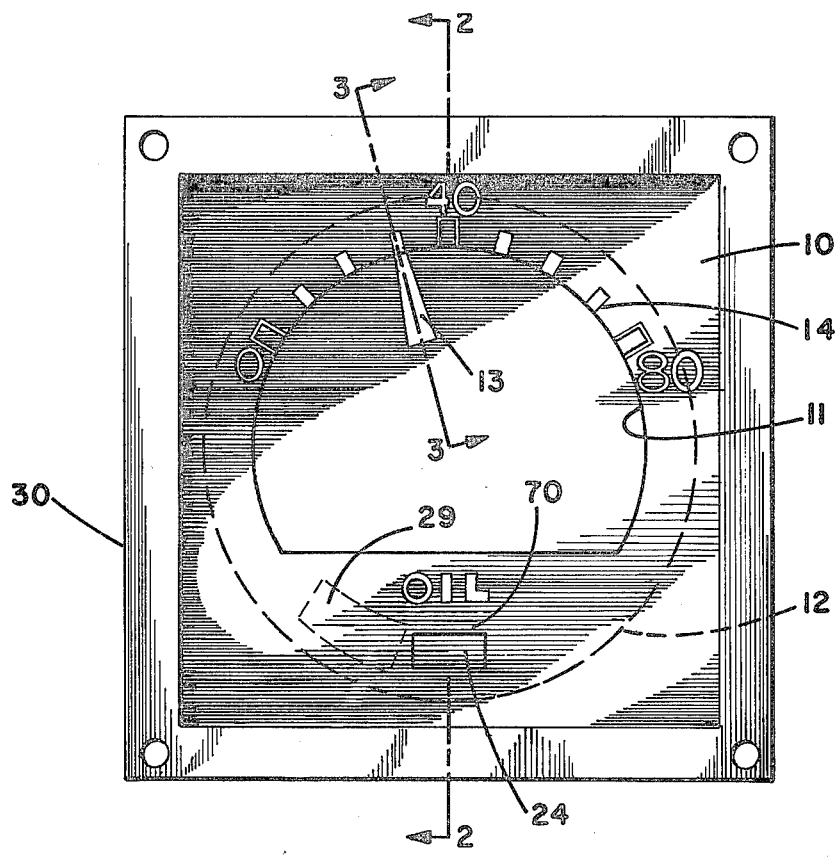
FIG. 1 is a front view of an instrument of the invention.
Figure 2:
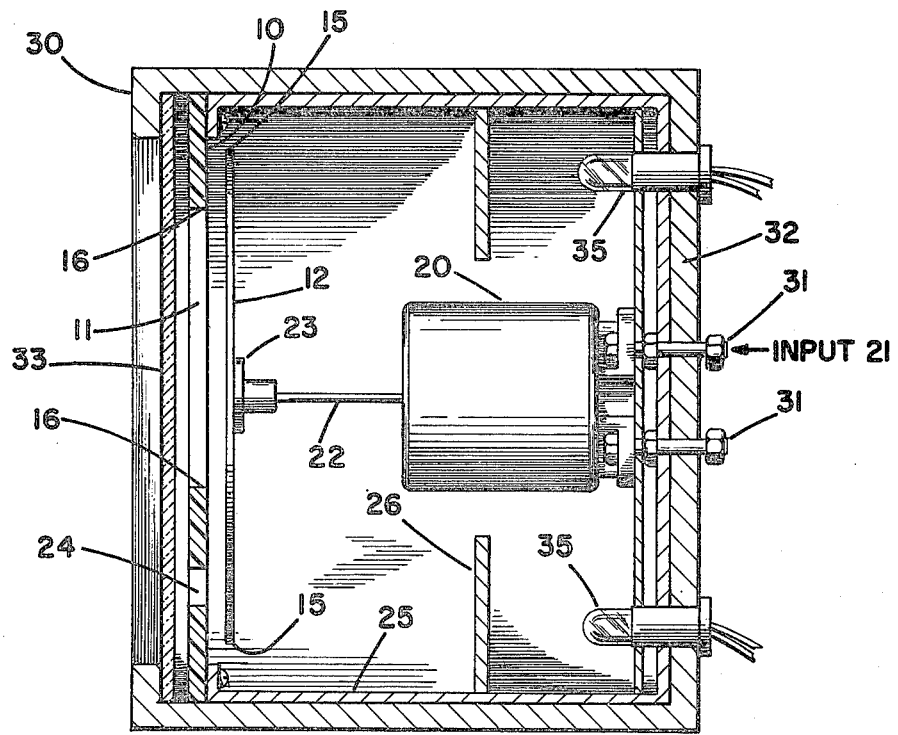
FIG. 2 is a cross-sectional view taken along line 2—2 of FIG. 1.

Referring to FIGS. 1 and 2, the dial face of the instrument includes an outer portion or ring 10 having a generally circular opening 11 in its center, and a rotating disc 12 centered on the opening 11 but positioned therebehind, closely adjacent to and overlapping the inner edges of the ring 10.

The disc 12 may be driven by any instrument motor mechanism 20 having an input 21 from appropriate sensors. Preferably the motor 20 will have a rotating output shaft 22 to which disc 12 may be attached. A preferred method of attachment is to glue the disc to a flange 23 fitted on the end of shaft 22.

The ring 10 may be supported by a frame 25 which is attached to the motor 20, such that the relative position of the ring 10 and the motor 20 are pre-established for purposes of calibration.

The assembly of the motor 20, disc 12, frame 25 and ring 10 may be attached within an outer housing 30 by studs 31 affixed to the motor housing and extending through the rear wall 32 of the housing 30. A protective glass 33 may be used to seal the front of the housing 30 and protect the instrument from the weather elements.

Lighting may be provided by a series of lights 35 mounted through the rear wall 32 of the houding 30. It is important that light radiating from the bulbs 35 not impinge directly upon any portion of the disc 12 or the outer ring 10 occupied by the pointer 13, the scale 14 or the red translucent warning area 29; and yet the entire area behind these members should be flooded with indirect light, both to assure adequate lighting of the pointer 13 and the scale 14 and yet avoid the appearance of overly bright or dim spots in either. To accomplish this, a series of baffles 26 should be affixed (as known to the art) within the housing 30 to break up the radiation from the bulbs 35.

In combination with the aforementioned lighting and baffles structure, and to avoid any light escaping between the ring 10 and the disc 12, the disc 12 must substantially overlap by a dimension $a$ the window opening in the ring 10. The extent of this overlap is governed not only by the necessity to prevent reflection of light therebetween, but also to provide space in the outer periphery of the disc 12 for the translucent warning area 29 which must remain hidden in the ring 10 as the needle 13 moves over a broad range. For best results, the outer edge 15 of the disc 12 should extend outwardly from the inner edge 16 of the ring 10 a distance greater than the height of any numerals or scribe marks which comprised the scale 14 appearing on the ring 10.

Figure 3:
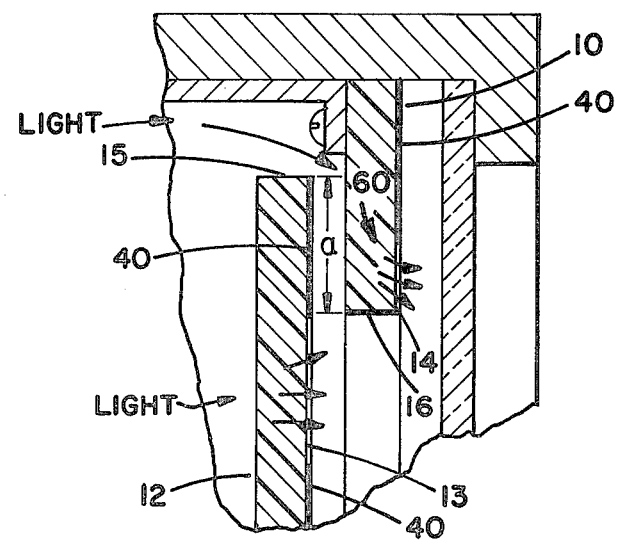
FIG. 3 is an enlarged cross-sectional view of an area of overlap between the outer scale ring and the indicator disc taken along line 3—3 of FIG. 1.

Referring to FIGS. 1 and 3, in order that only the scale 15 and the pointer 13 will be illuminated, the ring 10 and the disc 12 are preferably made of a translucent plastic material such as Plexiglass, the outer or front surfaces of which are generally covered with a layer of opaque material 40 except for those areas occupied by the scale 14, the pointer 13 and the window 29 through which light is intended to pass. These latter areas may be painted or covered with a colored translucent material.

Referring to FIG. 3, since the layer of opaque material 40 on the disc 12 may overlap the scale 14 on the ring 10, the ring 10 must be constructed of a material which will conduct light entering the back thereof (as indicated by the arrows) transversely through the body thereof as indicated by the arrow 60 and thence out throught the scale markings 14 in the periphery thereof. Plexiglass having a thickness of about 0.030 inches has been found to function satisfactorily. Note particularly that the edge 16 of the ring 10 should be covered with opaque material so that light will not radiate therethrough and create a ring of light on the dial face which will fog the presentation.

Referring to FIG. 1, the scale 14 may extend around the entire periphery of the opening 11 of the ring member 10. A pointer 13 may appear on any portion of the disc 12. Both pointer 13 and scale 14 are translucent so that light from bulbs 35 may exit therethrough. As no connection between the pointer 13 and any moving mechanism is visible, the pointer will appear to float in space as it moves along the scale 14.

The unique warning feature of the invention is acheived in part by providing a window 24 in the ring member 10; which window may comprise simply a rectangular opening in the ring 10. In conjunction with the window 24, a translucent area 29, preferably red in color, is provided in the opaque coating 40 on the disc 12. The red area 29 is positioned on disc 12 with respect to the pointer 13 so that it will move under the window 24 at the same time the pointer 13 moves to a dangerously high or low reading in response to movement of the motor 20. It should be noted that until the red translucent area 29 moves under the window 24, no indication at all will appear in the window 24; and in particular, there is no red lens or glass cover against which the sun may shine and create a false illusion. At the same time, there can be no mistaking the prescence of red in the window 24, either day or night, as in its absence the opaque layer 40 (normally black paint) will appear.

Figure 4:
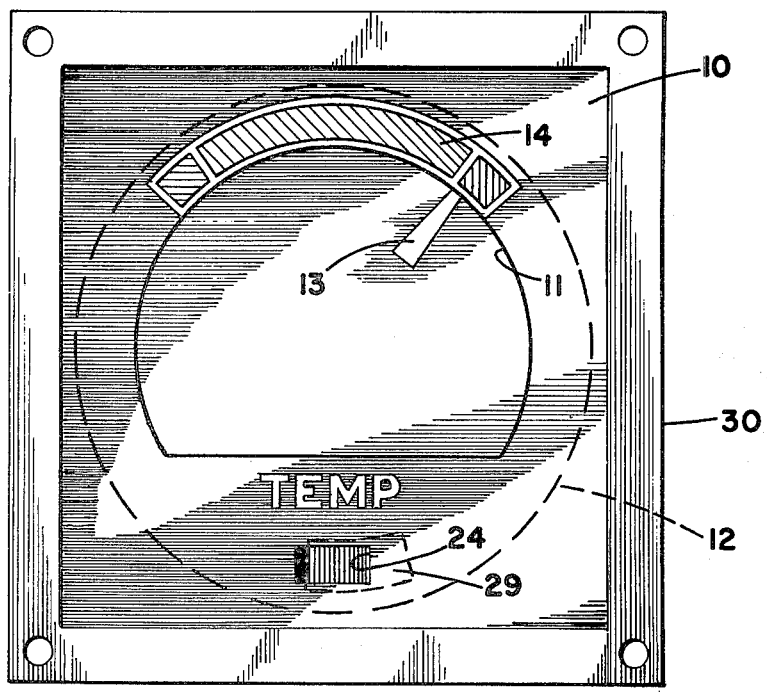
FIG. 4 is a front view of an instrument configured in accordance with the invention showning the appearance of the warning signal on the face of the instrument.

Operation of the instrument as above described is illustated in FIG. 4, which is representative of an engine operating temperature gauge. As the pointer 13 moves to the red area on the gauge scale 14, indicating that the engine is overheating, the red area 29 in the disc 12 will be either partially or fully under the window 24, thus functioning as a warning light. As movement of the red area 29 is directly related to movement of the disc 12 and the pointer 13, its function is directly related to operation of the motor 20, the operational state of which can be continually observed by the engine operator.

The structure of the invention provides an attractive and effective day and night visual display, not only of a scaled, reading but also of an effective visual warning. Obviously this structure may easily be adopted to instrumentation installation other than those aboard ships and boats.

While the principles of the invention have been described in connection with the above specific apparatus, it is to be clearly understood that this description is made only by way of example and not as a limitation to the scope of the invention.

We claim:

1. An indicating device comprising, a dial face including an outer scale bearing member and moving means positioned behind said scale bearing member to indicate a value reading on the scale;

means to drive said indicator means, and light radiating means apart from and behind said scale and indicator means for back lighting said dial face, characterized by said moving indicator means comprising an opaque surface having a translucent portion comprising a pointer, and said scale bearing member comprising a light conducting body having its front surface covered by an opaque material defining a translucent scale thereon, and wherein the opaque surface of said moving indicator overlaps the translucent scale portion of said scale bearing member sufficiently to block light radiating directly from said light radiating means so that light from said back lighting means passes indirectly and continuously to said translucent scale by diffusion through and in the plane of the lighting conducting body of said scale bearing member.

2. The device of claim 1 wherein said dial face further includes a visual warning feature comprising a separate translucent area on said moving indicator means illuminated by said back lighting means and a stationary companion window in said scale bearing member positioned apart from the scale, said separate illuminated translucent area being masked from view by the opaque portions of said scale member until positioned in conjunction with said window by movement of said indicator means to a position where said pointer indicates within a selected range on said scale.

3. The device of claim 2 further including light baffle means to prevent light from said back lighting means from impinging directly upon the translucent pointer and warning area portions of said moving indicator means.

4. The device of claim 2 wherein said scale bearing member comprises an outer ring having a value scale thereon, and a generally arcuate aperture therein adjacent said scale, and said indicator means comprises a generally circular member positioned behind said scale bearing member and covering said arcuate aperture.

5. The device of claim 4 wherein the edges of the arcuate aperture in said scale bearing member are coated with an opaque material so that diffused light does not escape therefrom.

6. The device of claim 2 wherein the translucent portions of said dial face are coated with translucent material of selected color.

7. The device of claim 2 wherein said window in said scale member comprises a simple aperture therein.

* * * * *